Dec. 17, 1929. J. J. FERRETTI Re. 17,524
PAPER MATCH MAKING MACHINE
Original Filed July 2, 1924 5 Sheets-Sheet 1.
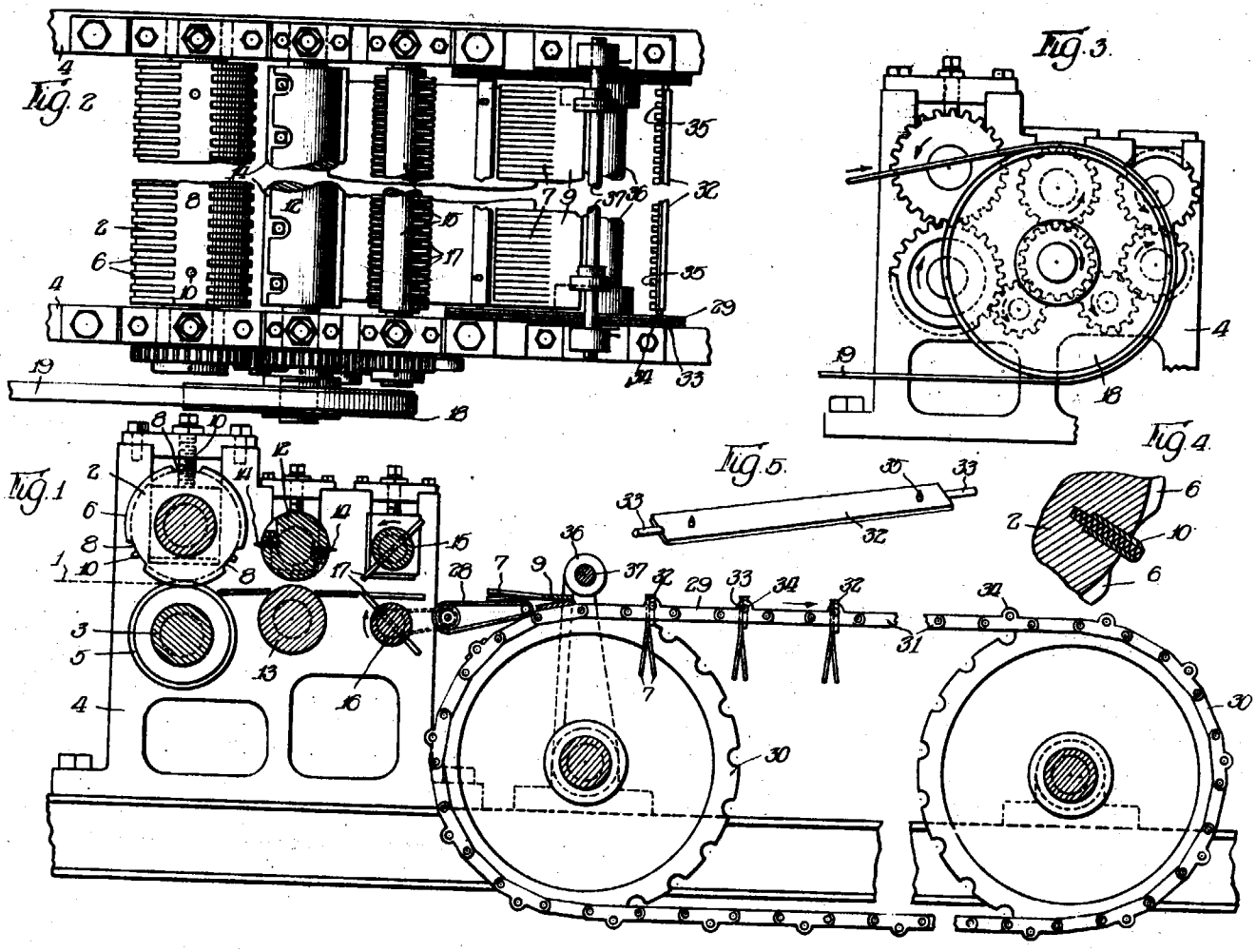
Inventor:
Julius J. Ferretti,
By Wilkinson, Huxley, Byron & Knight
Attys.

Dec. 17, 1929. J. J. FERRETTI Re. 17,524

PAPER MATCH MAKING MACHINE

Original Filed July 2, 1924 5 Sheets-Sheet 2

Inventor:
Julius J. Ferretti,
By Wilkinson, Huxley, Byron, & Knight
Attys.

Dec. 17, 1929. J. J. FERRETTI Re. 17,524

PAPER MATCH MAKING MACHINE

Original Filed July 2, 1924 5 Sheets-Sheet 3

Inventor:
Julius J. Ferretti,
By Wilkinson, Huxley, Byron & Knight
Attys.

Dec. 17, 1929. J. J. FERRETTI Re. 17,524

PAPER MATCH MAKING MACHINE

Original Filed July 2, 1924 5 Sheets-Sheet 4

Inventor:
Julius J. Ferretti,
By Wilkinson, Huxley, Byron, & Knight
Attys

Dec. 17, 1929. J. J. FERRETTI Re. 17,524

PAPER MATCH MAKING MACHINE

Original Filed July 2, 1924 5 Sheets-Sheet 5

Inventor:
Julius J. Ferretti,
By Wilkinson, Huxley, Byron & Knight
Attys.

Reissued Dec. 17, 1929 Re. 17,524

UNITED STATES PATENT OFFICE

JULIUS J. FERRETTI, OF BROOKLYN, NEW YORK, ASSIGNOR, BY MESNE ASSIGNMENTS, TO THE UNIVERSAL MATCH CORPORATION, A CORPORATION OF DELAWARE

PAPER-MATCH-MAKING MACHINE

Original No. 1,605,336, dated November 2, 1926, Serial No. 723,691, filed July 2, 1924. Application for reissue filed August 31, 1927. Serial No. 216,723.

This invention relates to machinery for making paper matches of the type ordinarily used for advertising purposes and which consists of a plurality of pasteboard match strips joined together at one end in leaves which are usually bound together to form small books adapted to be carried in the vest pocket.

The present invention contemplates machinery for automatically producing the leaves of attached match strips ready to be bound in usual book covers. It is the object of this invention, consequently, to provide simplified and improved mechanism for producing such leaves for match books from a roll of suitable paper or pasteboard, said machinery being capable of automatically cutting said roll at intervals longitudinally to form the laterally arranged match strips, and transversely to separate the book leaves from one another. The invention also contemplates the provision of mechanism for continually acting upon the leaves cut so as to successively dip the free ends of the match strips in paraffine, dry them, dip the tips of said match strips in an ignition substance, and discharge the completed leaves from the machine. The binding of said leaves into books may be subsequently accomplished in any suitable manner.

The invention will be first hereinafter described in connection with the accompanying drawings, which constitute part of this specification, and then more specifically defined in the claims at the end of the description.

In the acompanying drawings, wherein similar reference characters are used to designate corresponding parts throughout the several views:—

Figure 1 is a longitudinal vertical section of the front and rear end portions of a match making machine constructed substantially in accordance with this invention, intermediate parts of said machine being broken away.

Figure 2 is a broken plan view of the front portion of the machine as shown in Figure 1.

Figure 3 is a side elevation of the front end of the machine showing more particularly the driving pulley and its associated gears for operating the cutting, shaping and feeding rollers.

Figure 4 is a detailed sectional view of a portion of one of the shearing or longitudinally cutting rolls showing more clearly one of the spring pressed punches for forming the perforations to receive the binding wires in the leaves of the match book.

Figure 5 is a detailed perspective view of one of the transverse swinging members having pins for engaging said binding perforations in order to carry said leaves through the paraffine and ignition substance applying apparatus.

Figure 6:
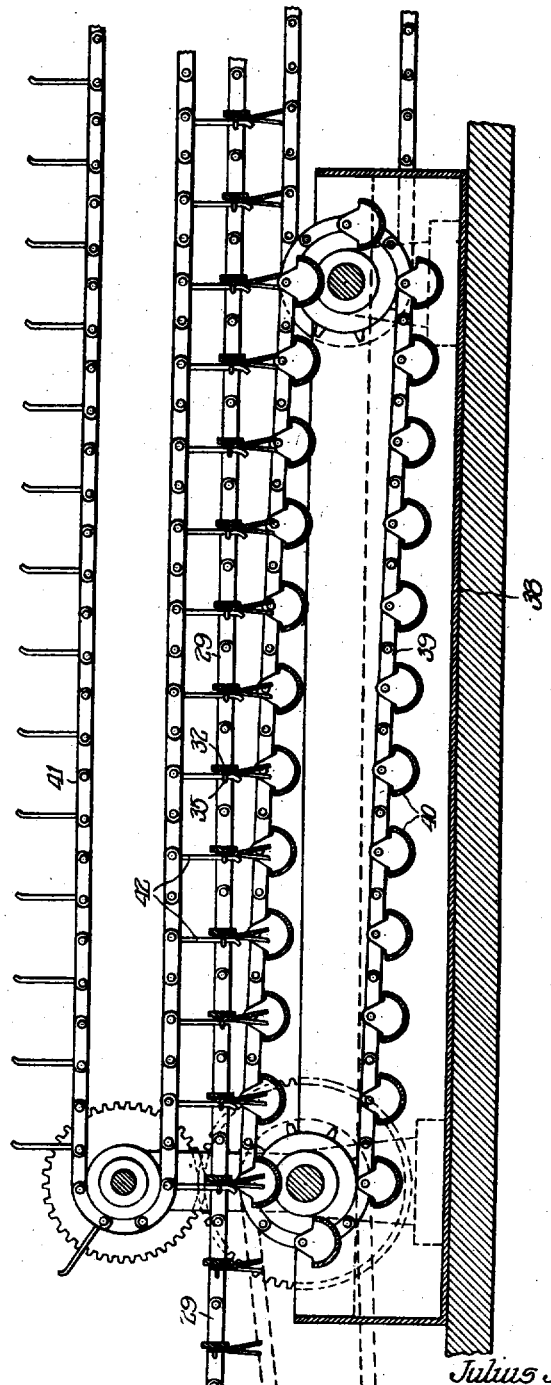
Figure 6 is a longitudinal vertical section through the paraffin applying portion of the machine.
Figure 7:
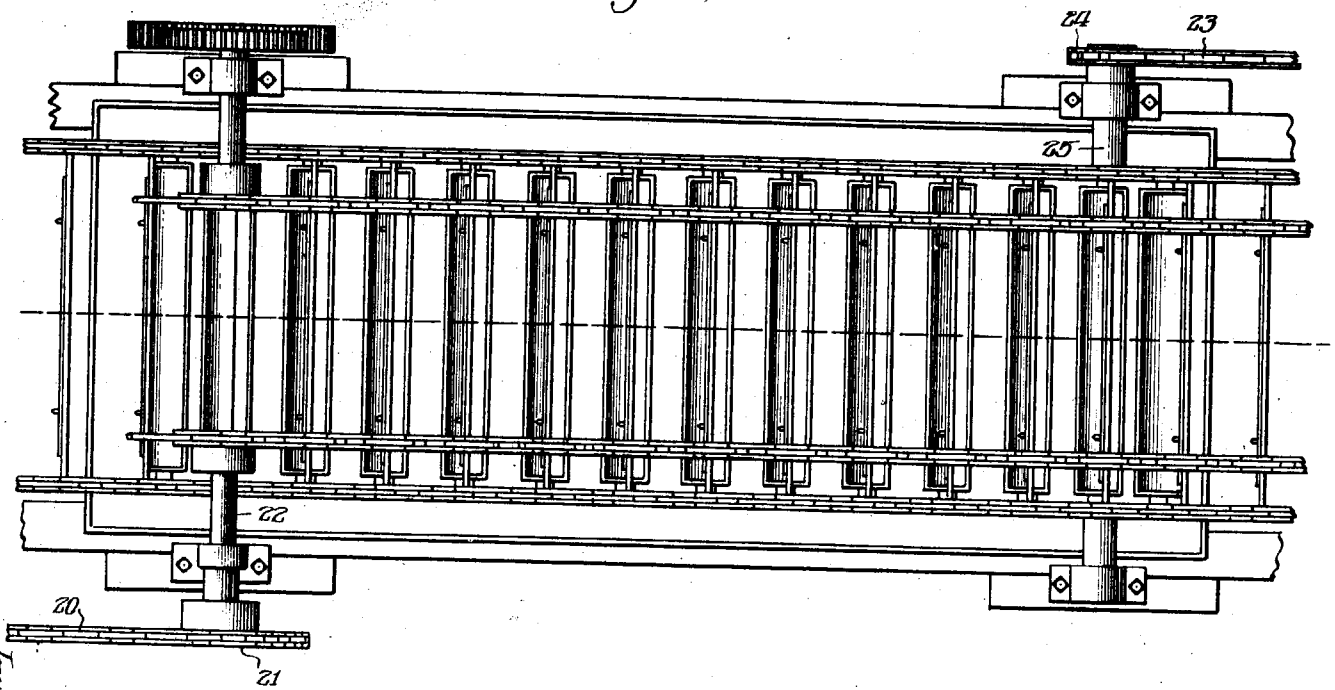
Figure 7 is a plan view of the same.
Figure 8:
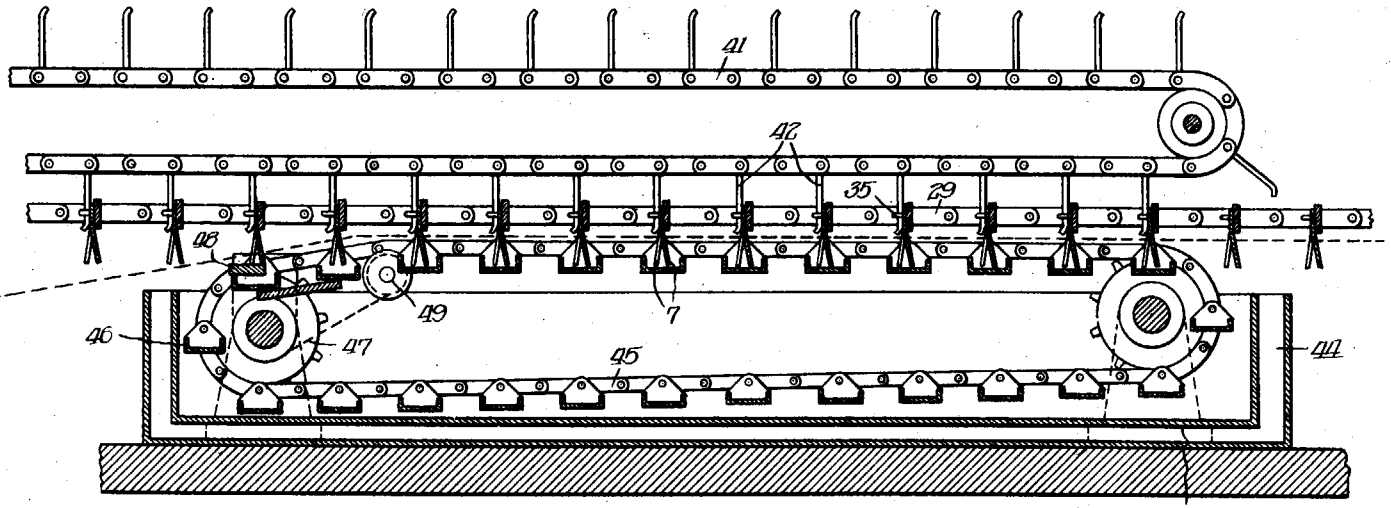
Figure 8 is a longitudinal vertical section of the portion of the machine for applying the ignition substance to the tips of the match strips.
Figure 9:
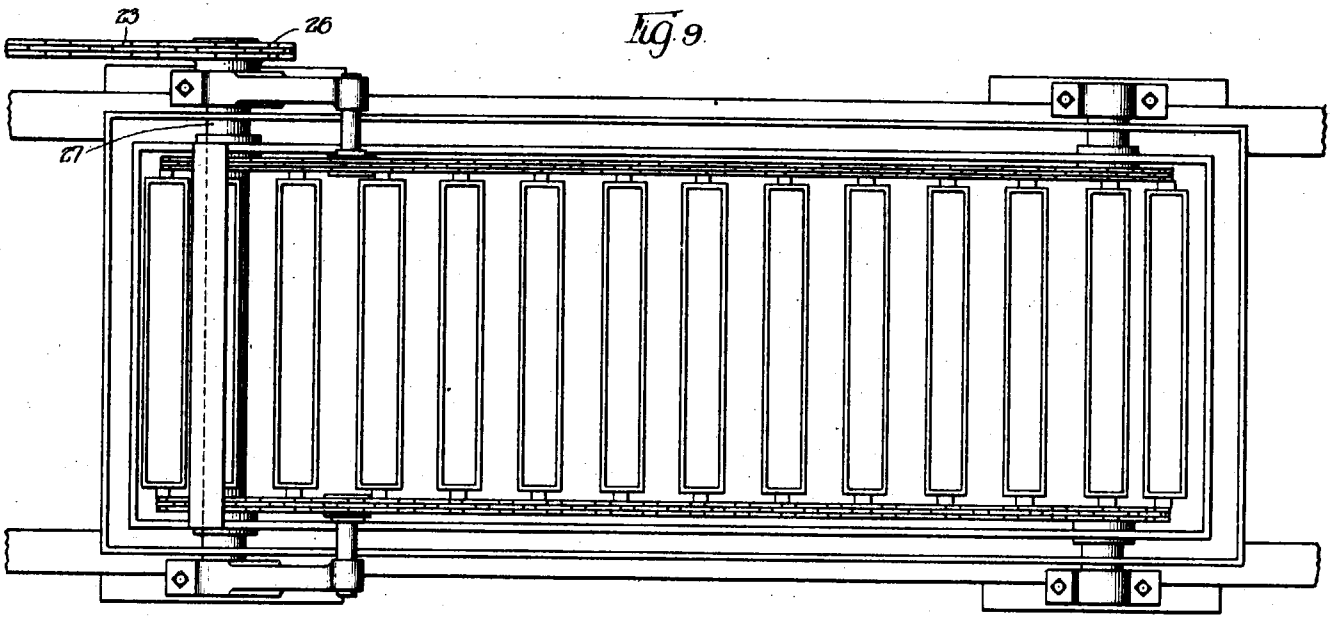
Figure 9 is a plan view of the latter with the conveyor for the match leaves omitted for the sake of clearness.
Figure 11:
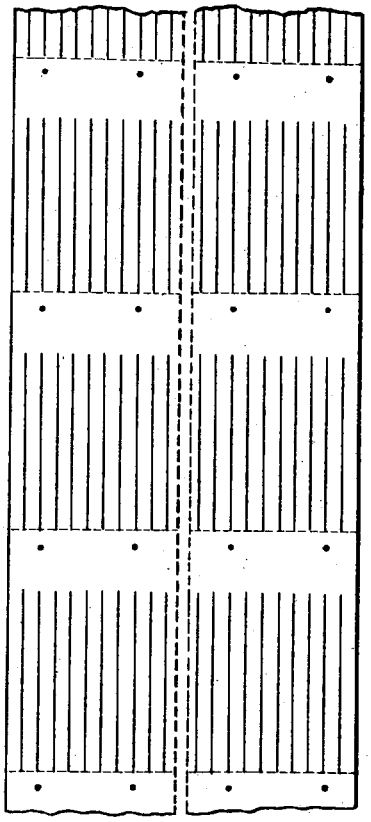
Figure 11 is a diagramatic plan view of the portion of a strip of paper or pasteboard indicated in broken lines the manner in which is cut by the machine and subsequently to separate the prepared match book leaves into narrower section if desired.

The match making machine, as illustrated in the accompanying drawings, is designed to have a strip of paper or pasteboard indicated by the broken line 1 in Figure 1 fed in at the left hand end of said machine, as illustrated in said figure, and said strip of paper 1 is fed continuously through the various devices which operate thereon until discharged at the right hand end of the apparatus illustrated in Figures 8 and 9, it being understood that the portion of the machine shown in Figures 6 and 7 is arranged between that shown in Figures 1 and 2 and that illustrated in Figures 8 and 9, and that in operation the match leaves are fed automatically and continuously from one section of the machine to another until discharge in completed condition.

At the extreme left hand end of the machine a pair of superimposed shearing cylinders 2 and 3 are suitably journaled in a frame 4. The lower shearing cylinder 3 has a series of parallel annular grooves 5 formed therein, while the upper shearing cylinder 2 has a plurality of sets of interrupted annular cutting blades 6 formed thereon and adapted to work in the grooves 5 in the cylinder 3 for cutting or shearing the paper strip 1 longitudinally at intervals for forming the individual matches or match blanks 7. As herein shown, the cylinder 2 has three sets of shearing or cutting knives 6 formed thereon with spaces 8 extending longitudinally on the surface of the cylinder between said sets of knives. These spaces 8 on the cylinder tube leave transverse portions on the paper strip 1 uncut after passing between the cylinders 2 and 3, and these uncut transverse portions 9 constitute the binding portions or ends of the match book leaves.

Figure 12:
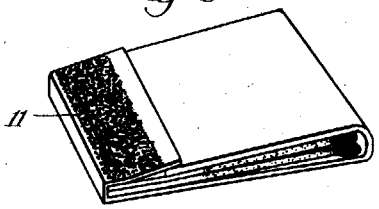
Figure 12 is a perspective view of a match book of the kind in which the match leaves made by the present machine are bound.
Figure 10:
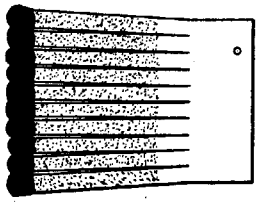
Figure 10 is a detailed view of one of the completed leaves for a paper match book such as the present machine is capable of producing.

Projecting from each of the spaces 8 between the sets of cutting knives 6 on the cylinder 2 there are two or more spring pressed punches 10, best shown in Figure 4. These punches are designed to perforate the uncut transverse portions 9 of the paper strip 1, said transverse portions 9 constituting the individual match book leaves, thus forming holes therein, which may be utilized for the passage of the binding wires 11, Figure 12, which serve to hold the match leaves in the books.

After passing between the cylinders 2 and 3, the paper strip 1 passes between another pair of superimposed cylinders 12 and 13 also suitably journaled on the frame 4. The upper one of these cylinders 12 carries longitudinally arranged knives 14 adapted to cooperate with the surface of the lower cylinder 13 for cutting the paper strip 1 transversely at suitable intervals according to the length of match leaf it is desired to make.

From the cylinders 12 and 13, the paper strip 1 passes between a pair of superimposed shaping cylinders 15 and 16 each having radial pins 17 spaced to engage alternate ones of the individual matches 7 of the book leaves for separating them or pressing them alternately up and down, as shown in Figure 1. This shaping of the individual matches or match blanks 7 is for the purpose of separating their free ends so that they may be properly coated with paraffine and dipped in ignition material during later operations of the machine.

The pairs of cylinders 2 and 3, 12 and 13, and 15 and 16, are suitably driven by gearing from a pulley 18, Figures 2 and 3, which may be driven by a belt 19 from any suitable source of power. The other operating portions of the machine may be driven by pulleys and belts or sprocket wheels and sprocket chains from the same or any other source of power as may be preferred. In Figures 6 and 7, the apparatus for coating the match blanks with paraffine is shown driven by a sprocket chain 20 engaging over a sprocket wheel 21 on a shaft 22 at the left hand end of this part of the machine, while the apparatus for applying the ignition material to the tips of the match blanks is driven by a sprocket chain 23 extending from a sprocket 24 on the shaft 25 at the right hand end of the paraffine applying section of the machine illustrated in Figures 6 and 7, to a sprocket 26 on a shaft 27 at the left hand end of the ignition material applying apparatus shown in Figures 8 and 9.

After the paper strip 1 has been cut longitudinally to form the individual match blanks, and transversely to form the book leaves, and said match blanks have been spaced apart as shown in Figure 1 by the shaping rollers 15 and 16, said leaves are fed over a belt 28 and delivered to an endless carrier 29 which conveys said leaves through the remaining operating parts of the machine. Said belt 28 may be driven from the pulley 18 by any suitable form of gearing. The conveyor 29 comprises sprocket wheels 30 and sprocket chains 31 mounted thereon. While both sprocket wheels 30 are shown in Figure 1, it will be understood that the right hand one is located at the extreme right hand end of the machine, and that the breaks in the sprocket chains 31 and the supporting frame for the sprocket wheels are to indicate that the paraffine coating and ignition material applying parts of the machine, which are separably illustrated in Figures 6 and 7, and 8 and 9, respectively, are interposed between said sprocket wheels 30 as shown in Figure 1.

The sprocket chains 31 of the conveyor 29 carry at equally spaced intervals swinging transverse strips or members 32 being pivotally supported by trunnions 33 projecting centrally from their ends and loosely engaging suitable bearing 34 formed in certain of the links of the chains 31. These swinging members 32 have projecting pins 35 adapted to frictionally engage the binding perforations formed by the spring punches 10 on the cylinder 2, whereby the book leaves consisting of an uncut transverse portion 9 of the paper strip and a transverse series of match blanks 7 attached thereto, may be supported and conveyed by the sprocket chains 31 through the paraffine applying and ignition material tipping apparatus of the machine. The pins 35 on the swinging members 32 are engaged with the binding perforations formed in the uncut transverse portions 9 of the book leaves by means of collars 36 adapted to rotate freely with a transverse shaft 37 supported above the sprocket wheel 30 at the left hand end of the carrier 29, said collar 36 being spaced just far enough above the swinging members 32 as they pass below the same to permit the uncut transverse portions 9 of said book leaves to pass below them and have their binding perforations frictionally engaged with the pins 35. After passing from below the collars 36 the book leaves swing to the vertical position indicated with the shaped or spread apart match blanks 7 depending from the upper bight of the sprocket chains 31, in which position they are conveyed through the remaining parts of the machine.

Referring to Figures 6 and 7 of the drawings, 38, indicates a tank for holding liquid paraffine, and 39 is an endless carrier mounted on an incline and having a series of buckets or transverse troughs 40 adapted to dip into the paraffine and raise sufficient thereof to coat the match blanks of each book leaf as it passes over said tank 38. It will be understood, of course, that the timing of the movement of the buckets 40 and the passage of the book leaves depending from the carrier 29 over the tank 38 is such as to insure the registering of a bucket full of paraffine as it is raised from the tank with the depending and spaced apart match blanks of each book leaf. The left hand end of the carrier for the buckets 40 is arranged somewhat higher than the right hand end thereof, so that as the conveyor 29 passes over the tank 38 from left to right in Figures 6 and 7, the buckets gradually drop away from around the match blanks 7 so that by the time the latter reach the right hand end of the tank 38 they are entirely free from said buckets, the latter being then dropped again into said tank for a fresh supply of paraffine. To insure the retention of the book leaves on the pins 35 of the swinging members 32 of the conveyor 29, an endless belt or chain 41 may be mounted above said conveyor 29 and be provided with projecting arms 42 to bear against said book leaves adjacent the points where they are engaged by said pins 35, as best shown in Figure 6. This belt or chain 41 carrying the bearing arms 42 preferably extends over the paraffine tank 38 and also over the ignition material tank 43 illustrated in Figures 8 and 9, although said belt is omitted in the latter figure for the sake of clearness.

The tank 43 for the ignition material is preferably provided with a hot water jacket 44 whereby said ignition material may be always kept in a sufficient fluid state to be handled for coating the tips of the match blanks 7 of the book leaves. An endless conveyor 45 carrying pivoted buckets 46 dips into the tank 43 and raises sufficient quantities of the ignition material in each bucket to coat the tips of the match blanks of each book leaf. At the left hand end of the tank 43, the conveyor 45 passes around a sprocket wheel 47 which serves to raise the bucket 46 out of the tank and to a level slightly below the tips of the match blanks as they travel over the tank on the conveyor 29. As the buckets 46 reach the top of the sprocket wheels 47 they pass below a fixed transverse strip 48 which levels off the ignition material in the bucket, it being understood that said ignition material is of a rather thick plastic consistency which is apt to cause it to become heaped up in the center of the buckets which might result in a greater quantity than necessary being applied to the tips of the match-blanks. As the buckets advance from the left hand sprocket wheel 47 the conveyor 45 rises by reason of its passing over rollers 49 mounted on a slightly high level, in order to bring the buckets 46 up to a position where the tips of the match blanks 7 will dip therein, see Figure 8. Said tips of the match blanks remain in the buckets until both reach the right hand end of the tank 43 when said buckets drop again into said tank, and said match blanks are carried by the conveyor 29 beyond the tank to any suitable point of discharge.

Space is preferably provided between the paraffine tank and the ignition tank for the purpose of cooling the coating of paraffine on the match blanks before the tips thereof are dipped in the ignition material. This cooling may be accomplished by forcing a current of cold air on the match blanks for a time determined by the distance traveled between said tanks.

I claim:

1. In a paper match making machine, the combination with an endless conveyor, of transverse swinging members mounted at intervals on said conveyor and having projecting pins thereon to engage the binding perforations in the studs of match book leaves for supporting the latter on said conveyor with their match blanks in depending position, a paraffine tank arranged below said conveyor, a train of buckets adapted to dip into said tank and apply a sufficient quantity of paraffine therefrom to coat the depending match blanks of each match book leaf as it passes over the tank, said bucket train being arranged on an incline for gradually removing them away from the match blanks as the latter advance toward the far end of the tank.

2. In a paper match making machine, the combination with an endless conveyor of transverse swinging members mounted at intervals on said conveyor and having projecting pins thereon to engage the binding perforations in the studs of match book leaves for supporting the latter on said conveyor with their match blanks in depending position, a paraffine tank arranged below said conveyor, a train of buckets adapted to dip into said tank and apply a sufficient quantity of paraffine therefrom to coat the depending match blanks of each match book leaf at it passes over the tank, said bucket train being arranged on an incline for gradually removing them away from the match blanks as the latter advance toward the far end of the tank, and an endless belt arranged above the conveyor, for the match book leaves, said belt having projecting pins adapted to engage the stubs of said leaves and hold them in engagement with the pins on the swinging members of said conveyor during the paraffine coating operation.

3. In a paper match making machine, the combination with an endless conveyor, of transverse swinging members mounted at intervals on said conveyor, means on said members to engage in the stubs of match book leaves for supporting the latter on said conveyor with their match blanks in depending position, a tank for ignition material over which the conveyor passes, and a train of individual buckets one for each book for raising a sufficient quantity of ignition material from said tank and applying the same to the tips of said match blanks during their passage over the tank.

4. In a paper match making machine, the combination with an endless conveyor, of transverse swinging members mounted at intervals on said conveyor and having projecting pins thereon to engage the binding perforations in the stubs of match book leaves for supporting the latter on said conveyor with their match blanks in depending position, a tank for ignition material having a hot water jacket around the same for the purpose specified over which the conveyor passes, and a train of buckets for raising a sufficient quantity of ignition material from said tank and applying the same to the tips of said match blanks during their passage over the tank, and means for levelling off each bucket before the dipping operation for the purpose specified.

5. In a paper match making machine, the combination with an endless conveyor, of transverse swinging members mounted at intervals on said conveyor, and having projecting pins thereon to engage the binding perforations in the stubs of match book leaves for supporting the latter on said conveyor with their match blanks in depending position, a tank for ignition material having a hot water jacket around the same for the purpose specified over which the conveyor passes, a train of buckets for raising a sufficient quantity of ignition material from said tank and applying the same to the tips of said match blanks during their passage over the tank, a belt arranged above the conveyor for the match book leaves, and projecting pins on said belt to engage the stub of said leaves for holding them in engagement with the pins on the swinging members of said conveyor during their passage over the tank.

6. In a paper match making machine, the combination with an endless conveyor, of transverse swinging members mounted at intervals on said conveyor and having projecting pins thereon to engage the binding perforations in the stubs of match book leaves for supporting the latter on said conveyor with their match blanks in depending position, a paraffine tank arranged below said conveyor, a train of buckets adapted to dip into said tank and apply a sufficient quantity of paraffine therefrom to coat the depending match blanks of each match book leaf as it passes over the tank, a tank for holding ignition material and having a hot water jacket arranged behind said paraffine tank and over which the conveyor for the match book leaves pass, a train of buckets for raising sufficient quantities of said ignition material from said tank to coat the tips of the match blanks of said leaves as the latter pass over the tank, a belt arranged above both the paraffine and ignition material tanks, and projecting pins on said belt adapted to engage the stubs of said match book leaves and retain them in engagement with the pins on the swinging members of the conveyor for said leaves during the passage of the latter over both tanks.

7. In a paper match making machine, the combination with an endless conveyor, of means on said conveyor for supporting match book leaves by their stubs and with their match blanks in depending position, said conveyor, extending over said tank, a train of buckets separate from each other and mounted on an endless conveyor having its lower bight arranged in the tank and its upper bight arranged above said tank, each of said buckets being adapted to register with one of the match book leaves as the latter pass over the tank for coating the tips of the match blanks with said ignition material, means for levelling off each bucket prior to the dipping of the tips of the match blanks of the corresponding leaf into the same, and an idler roller for the bucket conveyor arranged in advance of the levelling device for causing the buckets to rise into position to have the tips of the match blanks dipped therein.

8. In a match making machine, a conveyor for match books, means on said conveyor for supporting a match book in depending position, a traveling bucket beneath said conveyor to receive the lower end of said book, a traveler overlying said conveyor, and a finger on said traveler for engaging said book and holding the same on said conveyor.

9. In a machine for making match-book leaves, the combination, with a continuously moving conveyor, of a train of leaf holders carried thereby, means for forming match-book leaves from a continuously moving strip of material and transferring the leaves to the said holders without interrupting the continuity of movement of the said conveyor.

10. In a machine for making match-book leaves, the combination with a continuously moving conveyor, of means for forming match-book leaves and transferring them to the said conveyor, the whole being so organized that the said leaves during the transferring operation move substantially in the same direction and at the same speed as that of the said conveyor, whereby the leaves are received on the said conveyor without interrupting the continuity of its movement.

11. In a machine for making match book leaves, the combination with a continuously moving conveyor bearing a series of match-book leaf holders, of means for forming the said leaves and transferring them successively to respective leaf holders, the whole being so organized that the said leaves during the transferring operation move substantially in the same direction and at the same speed as that of the said holders, whereby the leaves are received on the said holders without interrupting the continuity of the movement of the conveyor.

12. In a machine for making match-book leaves, the combination with a continuously moving conveyor, of means for operating upon a continuously moving strip of leaf material to form match-book leaves and for transferring the said leaves to the said conveyor, the whole being so organized that the said leaves during the transferring operation move substantially in the same direction and at the same speed as that of the said conveyor, whereby the leaves are received on the said conveyor without interrupting its continuity of movement.

13. In a machine for making match-book leaves, the combination with a continuously moving conveyor, of means presenting cutting edges adapted to cut a continuously advancing strip of leaf material to form match leaves each having a stub portion and a plurality of match blanks projecting therefrom, of a pair of rotating elements disposed on opposite sides of and with their axes arranged transversely of said leaves and each having a longitudinal series of pins projecting substantially radially therefrom to engage alternately in opposite directions, the said pins also functioning to continue the advance of the leaves toward and in the direction of movement of the said conveyor after the said leaves have been completely severed from the advancing strip of card material.

14. In a machine for making match-book leaves, the combination with a continuously moving conveyor, of a pair of cooperating continuously rotating cylinders adapted to draw in a strip of leaf material and presenting a longitudinal series of annular cutting edges cooperating together during a part of a revolution to cut said strip longitudinally at intervals to form a longitudinal series of transverse rows of longitudinally extending match blanks, a continuously rotating cutter head having its axis and a cutting edge arranged transversely to the said strip so as to cut the continuously moving strip transversely at intervals in line with one end of each of the groups of match blanks for forming match book leaves, and continuously moving means for spreading alternate match blanks apart so as to separate their free ends and for simultaneously advancing the completely severed leaves from the said cutter-head and presenting them to the said conveyor in predetermined positions thereon.

15. In a machine for making match-book leaves, the combination, with a conveyor having pins thereon for holding match-book leaves, of means for forming match-book leaves and perforating them to provide openings for the said pins and subsequently transferring them to the said conveyor in predetermined positions thereon so that the said openings are engaged by the said pins.

16. In a machine for making match-book leaves, the combination with a continuously moving conveyor having pins thereon for holding match-book leaves, of means for forming match-book leaves from a continuously moving strip of leaf material and perforating them to provide openings for the said pins and subsequently transferring the said leaves to the said conveyor so that the said pins enter the said openings in the said leaves.

17. In a machine for making match-book leaves, the combination, with a conveyor having pins thereon for holding match-book leaves, of means for forming match-book leaves and perforating them to provide openings for the said pins, and means for spreading apart the free ends of the match blanks of said leaves and transferring the said leaves to the said conveyor in predetermined positions thereon so that the said pins are engaged by the said openings.

18. In a machine for making match-book leaves, the combination with a conveyor having pins thereon for holding match-book leaves, of means for forming match-book leaves and perforating them to provide openings for the said pins and for placing the said leaves on the said conveyor so that the said openings register with the said pins, and means for pressing the said leaves down upon the pins with which their openings register.

19. In a match making machine the combination of a paraffine holder and a conveyor adapted to carry match blanks in depending position and dip the same into the said holder, the organization being such that the blanks, immediately after being dipped in the said holder, are withdrawn gradually and uniformly therefrom as the conveyor advances.

20. In a match making machine, the combination of a paraffine tank, a plurality of buckets adapted individually to travel in succession in an endless path through said tank and rise therefrom and then pass down a gradual incline, and a conveyor adapted to advance horizontally with and over the buckets on the said incline and to carry match blanks in depending position and in registration with the said buckets, whereby the lower ends of the blanks are dipped in the buckets at the head of the incline and are gradually and uniformly withdrawn therefrom as the conveyor and buckets advance.

21. A machine for making match combs embodying means for feeding stock with a continuous and uninterrupted rectilinear motion, and means for intermittently spacing and slitting longitudinally spaced portions of the moving stocks in a direction parallel to the direction of movement of the stock to subdivide the width of said portions of the stock into match widths.

22. A machine for making match combs embodying means for feeding stock with a continuous and uninterrupted rectilinear motion, means for intermittently spacing and slitting longitudinally spaced portions of the moving stock in a direction parallel to the direction of movement of the stock to subdivide the width of said portions of the stock into match widths, and means for cutting off predetermined lengths of the stock to produce match combs.

23. A machine for making match combs embodying means for feeding stock with a continuous and uninterrupted rectilinear motion, means for intermittently slitting longitudinally spaced portions of said stock in a direction parallel to the direction of movement of the stock to subdivide the width of said portions of the stock into match widths, means for cutting off predetermined lengths of stock to produce match combs, and means for separating adjacent teeth of each comb while the comb is moving rectilinearly.

24. A machine for making match combs embodying cooperating rollers for feeding stock longitudinally, cutting devices associated with at least one of said rollers and extending circumferentially of the roller and having at least one non-cutting gap therein constructed to space the portions of the strip whereby said cutting devices are adapted to slit longitudinally spaced portions of the moving stock in a direction parallel to the direction of travel of the stock for the purpose of subdividing the width of said portions of the stock into match widths, and means for continuously and uninterruptedly rotating said rollers.

25. A machine for making match combs embodying a plurality of rotary cutters having arcuate cutting edges axially spaced apart a distance substantially equal to the width of a match, means to rotate the cutters continuously, and means for continuously and uninterruptedly feeding stock into cooperation with said cutters, at the same speed as the speed of the cutters and in a direction to cause the cutters to space and intermittently slit the stock parallel to the direction of movement of the stock.

26. A machine for making match combs embodying a plurality of rotary knives spaced apart and rotating on a fixed axis, and means for continuously and uninterruptedly feeding strip stock to said knives at the same speed as the knives are rotating and in a direction parallel to the lateral edges of the strip for the purpose of effecting longitudinal slitting of the strip into transverse subdivisions substantially equal to the width of the matches, portions of the peripheries of said knives being cut away whereby the slits made in the strip are substantially equal in length to the length of matches and are spaced apart longitudinally of the stock.

27. A machine for making match combs embodying a plurality of rotary knives spaced apart a distance substantially equal to the width of a match and mounted on a common axis, means for continuously and uninterruptedly feeding strip stock to said rotary knives at the same speed as the knives are rotating and in a direction parallel to the lateral edges of said stock, whereby said knives will transversely subdivide said stock into slits laterally spaced apart a distance equal to the width of the match, portions of the peripheries of said knives being cut away to leave individual effective cutting edges substantially equal in length to the length of a match so that the slots formed in the strip are substantially equal to the length of a match, and the cut away portions of the knives being coextensive with the uncut portions of the stock required to form the bases of the combs.

28. A machine for making match combs embodying means for feeding stock with a continuous and uninterrupted rectilinear motion, and means for intermittently spacing and slitting longitudinally spaced portions of said stock in a direction parallel to the direction of movement of the stock, and while the stock is moving, to subdivide the width of said portions of the stock into match widths, in combination with means operable upon the moving strip, to transversely cut the strip into lengths, each embodying a comb having a slit and unslit portion.

29. A machine for making match combs embodying means for feeding stock with a continuous and uninterrupted rectilinear motion, and means for intermittently spacing and slitting longitudinally spaced portions of said stock in a direction parallel to the direction of movement of the stock, and while the stock is moving, to subdivide the width of said portions of the stock into match widths, in combination with means operable upon the strip, while said strip is traveling, to transversely cut the moving strip into lengths, each embodying a comb having a slit and unslit portion.

30. A machine for making match combs embodying means for feeding stock with a continuous and uninterrupted rectilinear motion, and means for intermittently slitting longitudinally spaced portions of said stock in a direction parallel to the direction of movement of the stock to subdivide the width of said portions of the stock into match widths, in combination with means operable upon the strip to transversely cut the strip into lengths, each embodying a comb having a slit and unslit portion, and means operable upon said cut off comb portions, while the comb is traveling, to bend or offset adjacent teeth thereof in opposite directions to facilitate subsequent dipping.

31. A machine for making match combs embodying means for continuously and uninterruptedly feeding strip stock, said means embodying cutting devices serving to intermittently slit the strip at spaced portions of the strip longitudinally thereof into transverse subdivisions substantially equal in width to the width of the matches, and leave between these longitudinally spaced slit portions of the strip unslit intermediate portions.

32. A machine for making match combs embodying means for slitting strip stock longitudinally of its lateral edges to subdivide said stock transversely into match widths by slits equal in length to match lengths, means for thereafter cutting the strip transversely into lengths each comprising a comb having a slit and an unslit portion, means thereafter operable upon the comb to bend or offset adjacent teeth thereof in opposite directions to facilitate subsequent dipping, and means for continuously and uninterruptedly feeding the strip stock through the said slitting, cutting and bending operation.

33. A machine for making match combs embodying means for feeding strip stock continuously and uninterruptedly, means for slitting the stock longitudinally of its lateral edges, while the strip is traveling, to subdivide said stock transversely into match widths by slits equal in length to match lengths, means, operable while the strip continuous to travel, for thereafter cutting the strip transversely into lengths each comprising a comb having a slit and unslit portion, and means thereafter operable upon the comb, and while it continues to travel, to bend or offset adjacent teeth thereof in opposite directions to facilitate subsequent dipping.

34. In match making machines, a conveyor comprising a flexible element, a plurality of swinging carriers pivotally mounted on said flexible conveyor, said carriers having pins projecting from one side thereof and means associated with said conveyor for swinging said carriers to a position where said pins extend transversely to the direction of travel of said conveyor.

35. Match making machines comprising in combination means for feeding pre-formed match leaves in a predetermined path, a conveyor, one run of which travels in said path, said conveyor having swinging match leaf carriers provided with means for affixing match leaves to said carriers, said last named means being effective to affix said leaves to said carriers by a relative movement between said leaves and carriers in a direction transverse to the travel of said carriers at the moment of fixation.

36. Match making machines comprising in combination a conveyer having a plurality of swinging match leaf carriers, means on said carriers for affixing leaves thereto effective when the leaves are moved relative to said means in a predetermined direction, feeding means advancing match leaves in a predetermined path said conveyor throughout a portion of its travel moving in a path approaching said predetermined path and finally proceeding in said predetermined path, and means presenting said carriers at the location where the path of said conveyor merges with said predetermined path, in a position whereby the relative movement of said carriers and match leaves will cause said leaves to become affixed to said carriers.

Signed at New York city, New York, this 13th day of July, 1927.

JULIUS J. FERRETTI.